Dec. 23, 1924.
R. W. WORKMAN
BORING HEAD
Filed March 14, 1923
1,520,382
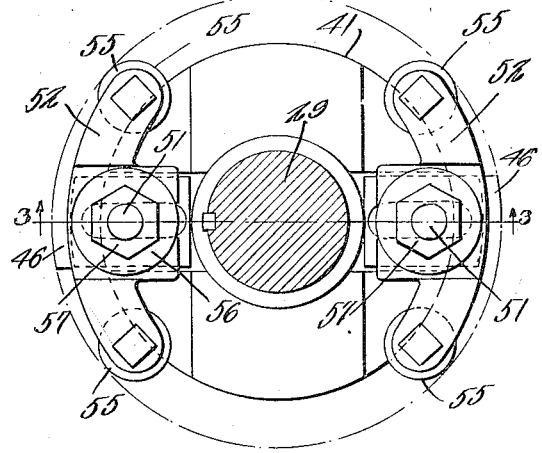
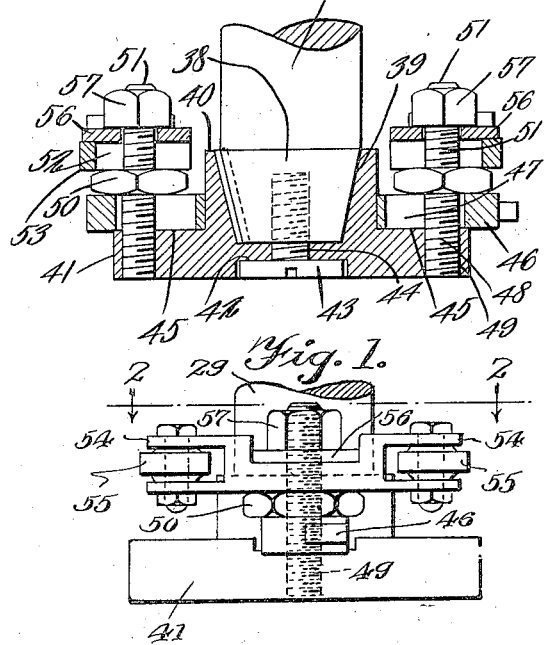
Inventor,
R. W. Workman.
By C. A. Snow & Co.
Attorneys Patented Dec. 23, 1924.

1,520,382

UNITED STATES PATENT OFFICE.

RAYMOND W. WORKMAN, OF CARSON CITY, NEVADA.

BORING HEAD.

Application filed March 14, 1923. Serial No. 625,098.

*To all whom it may concern:*

Be it known that I, RAYMOND W. WORKMAN, a citizen of the United States, residing at Carson City, in the county of Ormsby and State of Nevada, have invented a new and useful Boring Head, of which the following is a specification.

This invention relates to a portable reboring machine designed primarily for reboring automobile and other engine cylinders.

One of the objects of the invention is to provide a cutter head adapted to be detachably connected to the spindle of the machine and which has novel means adjustably connected thereto for holding the cutter head against vibration and maintaining it properly centered in the work.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit of the invention as claimed.

In the accompanying drawings the preferred form of the invention has been shown.

In said drawings:

Figure 1 is an enlarged elevation of the cutter head and the parts thereon.

Figure 2 is a horizontal section through the cutter head, on line 2—2 Figure 1.

Figure 3 is a section on line 3—3 Figure 2.

A spindle 29 of a reboring machine or the like as shown at 38 and is adapted to be seated in a tapered recess 39 formed in a hub 40 provided at the center of one side of a cutter head 41. This cutter head is circular and has a recess 42 for receiving the head 43 of a screw 44 insertible into the end of the spindle 29. Thus the cutter head can be secured firmly to the spindle so as to rotate therewith.

Formed in the cutter head are diametrically opposed grooves 45 each of which is adapted to receive a cutter 46 having a longitudinal slot 47. Threaded studs 48 extend through the slots 47 into openings 49 provided therefor and the heads 50 of these studs are adapted to bear tightly upon the cutters. Each stud has a threaded stem 51 projecting from the head 50 and each stem is designed to project through a slot 52 formed within the central portion of an arcuate centering strip 53. The ends of the strip are forked as shown at 54 and have rollers 55 journaled therein.

A washer 56 is mounted on each stem and is adapted to bear upon the strip 53. A nut 57 engages each stem for the purpose of binding said washer upon the strip 53 to hold said strip in any position to which it may be adjusted.

In using this apparatus the same is arranged with the spindle 29 in line with the longitudinal center of the cylinder bore to be cut. The cutter head will also be centered and the cutters will be adjusted radially so as to produce a cut of the desired depth.

After the adjustment of the parts the spindle is set in motion and the cutters caused to cut into the wall of the cylinder for a short distance, thus to start the reboring operation. The strips 53 are then adjusted outwardly so that the rollers 55 will bear firmly against the newly cut portion of the cylinder. After these parts have been adjusted and then secured by means of the nuts 57 the operation of the device can be started once more. As the metal is cut away the rollers 55 will travel over the surface of the rebored portion and thus hold the cutter head against vibration and properly centered. The cutter head is of course fed into the cylinder as it rotates, this operation continuing until the reboring is completed.

What is claimed is:

1. A head for portable reboring machines, having opposed grooves, cutters adjustably mounted in the grooves, arcuate centering strips adjustably connected to the head, and work engaging rollers on the strips.

2. A grooved cutter head for reboring machines, cutters adjustable radially thereon, arcuate centering strips radially adjustable on the cutter head and work engaging rollers carried by the strips.

3. A cutter head for reboring machines, studs engaging the same, radially adjustable cutters engaging the studs, radially adjustable centering devices engaging the studs, said studs constituting means for securing the cutters and the centering devices fixedly to the cutter head, and work engaging rollers upon the centering devices.

4. A cutter head, having opposed grooves therein, a recessed hub centrally located upon the head, and between the grooves, cutters seated in the grooves and slotted longitudinally, threaded studs engaging the head and extending through the slotted cutters, means on the studs for engaging the cutters to hold them against movement in the grooves, an arcuate centering strip mounted on each stud, and rollers carried by the end portions of each centering strip.

In testimony that I claim the foregoing as my own, I have hereto affixed my signature in the presence of two witnesses.

RAYMOND W. WORKMAN.

Witnesses:
J. E. SIMPSON.
HERBERT D. LAWSON.